2,826,244

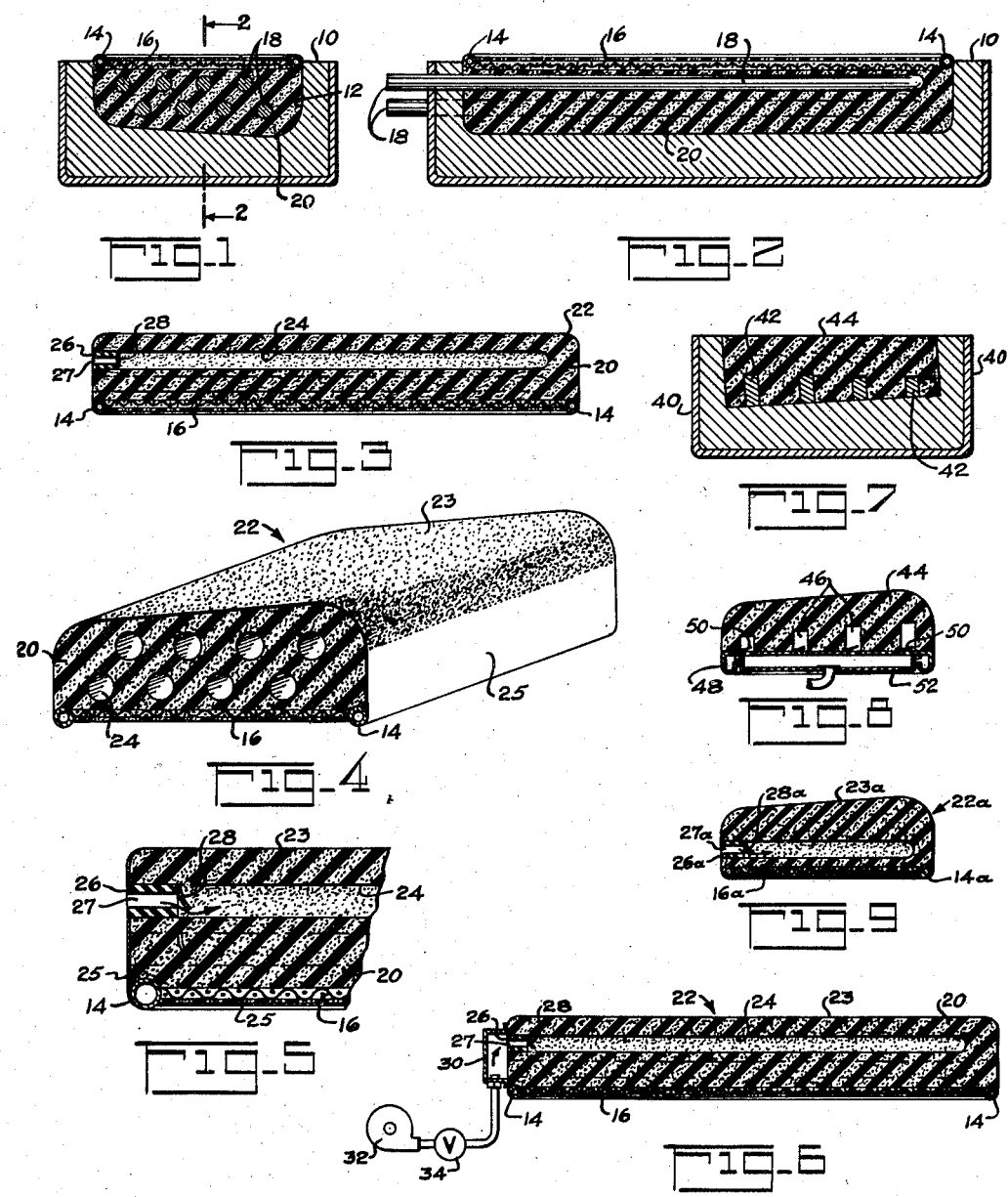

SEAT CUSHION OF FOAM-TYPE MATERIAL AND METHOD OF FABRICATING SAME

Roy T. Hurley, Ridgewood, N. J., assignor to Curtiss-Wright Corporation, a corporation of Delaware Application February 24, 1954, Serial No. 412,328

10 Claims. (Cl. 155—179)

This invention relates to seat cushions and is particularly directed to cellular or foam-type seat cushions and to a method of making such cushions.

The invention has been designed for use in connection with automobile seat cushions but obviously is not limited to this specific application. As used herein, the term "seat cushion" is intended to be broad enough to mean any seat cushion against which the occupant of a seat rests a portion of his body as for example, the cushion of a seat on which a person sits and/or the back seat cushion of a seat.

An object of the present invention is to provide a seat cushion through the surface of which cooling air is pumped or forced against and around the portions of the body of the seat occupants contacting the seat. Another object of the invention is to provide a seat cushion which is so constructed that the normal movements of the person on the seat provide said pumping or forcing effect. A further object of the invention comprises the provision of a novel method of fabricating such a seat cushion.

Other objects of the invention will become apparent upon reading the annexed detailed description in connection with the drawing in which:

Fig. 1 is a sectional view through an open mold in which a seat cushion embodying the invention has been molded;

Fig. 2 is a sectional view taken along line 2—2 of Fig. 1;

Fig. 3 is a sectional view similar to Fig. 2 but with the cushion removed from the mold and with means added for closing the ends of the cushion cavities;

Fig. 4 is a perspective view of a seat cushion after removal from the mold;

Fig. 5 is an enlarged sectional view of a portion of Figs. 3–4.

Fig. 6 is a view similar to Fig. 3 but illustrating a modified construction;

Fig. 7 is a view similar to Fig. 1 but illustrating a modified molding procedure;

Fig. 8 is a sectional view of a cushion made from the mold of Fig. 7; and

Fig. 9 is a sectional view of a modified cushion construction.

The present invention makes use of foam-type materials having rubber-like elasticity and having open cells. Foam plastics which foam in place are now commercially available and are particularly suitable for making seat cushions in accordance with the invention. For example, Farbenfabriken Bayer A. G., a corporation of Germany, prepares and sells such foam plastics and the mix therefor under the trade name Moltopren. Moltopren foam plastics are made by the reaction of a polyisocyanate with a reactive ester with the simultaneous evolution of a blowing gas through a reaction involving isocyanate groups where a "polyisocyanate" is any organic compound containing two or more —N=C=O groups or is any organic compound capable of splitting up with the formation of a compound containing two or more free —N=C=O groups and useful for making hard or elastic porous materials by reacting with a reactive ester with the simultaneous evoltuion of a blowing gas through a reaction involving isocyanate groups and where a "reactive ester" is an organic polyester containing two or more radicals attached to carbon atoms and capable of reacting with —N=C=O groups. Moltopren foam plastics are available in a relatively rigid or in an elastic rubber-like condition and with open or closed cells. Cells of foam material are said to be closed when the walls of each cell are imperforate to seal the cell from communication with adjacent cells whereas cells are said to be open when the walls separating adjacent cells are perforate to provide passages interconnecting adjacent cells.

Referring now to Figs. 1 and 2 of the drawing there is illustrated a mold 10 having a mold cavity 12 in the form of the desired seat cushion shape. Ordinary plaster of Paris is a suitable material for the mold. The walls of the mold cavity 12 are coated with a suitable wax as for example carnauba wax or other mold release agent so that the subsequently molded foam plastic seat cushion can be readily removed from the mold. A suitable rigid frame 14 is supported around the outer edge of the mold cavity and a wire mesh screen 16 is stretched across the inner edge of said frame. The screen 16 may have an open mesh of the order of ordinary chicken wire. The mold 10 also has a plurality of cylindrical core rods 18 extending across the mold and spaced from the top and bottom surfaces of the mold. Said rods may also be coated with a suitable mold release agent to prevent adhesion of the foam plastic to said rods.

The foam mix, which preferably comprises the aforementioned Moltopren foam mix, is poured or injected through the open upper side of the mold 10. A foam mix is used which results in a foam plastic having a rubber-like elasticity and in which preferably at least a majority of the cells are of the open type. Sufficient foam mix is introduced so that the resulting foam plastic material 20 covers the wire screen 16. The foam plastic material 20 adheres to the wire 16 and to the frame 14 so that the material 20 and frame 14 form an integral cushion structure 22. Moltopren foam material can be cured by standing at room or at somewhat elevated temperatures for a particular length of time, said time and temperature depending on the particular composition of the foam material.

After curing, the core rods 18 are removed by pulling said rods from the side of the mold thereby leaving elongate cavities 24 (Figs. 3 to 5) in the seat cushion. Obviously the cells in the foam material 20 are very small in size compared to that of said cavities 24. The seat cushion is then removed from the mold. Suitable suction cups applied to the upper surface of the material 20 can be used for this purpose. The provision of the aforementioned mold release agent to the walls of the mold cavity and to the rods 18, as previously described, facilitates said removal of the core rods 18 and the cushion.

With the Moltopren foam mix described, an imperforate layer or skin forms over the outer surface of the molded foam plastic. In accordance with the present invention this imperforate layer is removed from only that portion of the seat cushion through which cooling air flow is desired. This imperforate layer can be removed, where desired, for example, by grinding it off or by slicing it off by a skiving operation.

The cushion illustrated is the bottom cushion for a seat. In such a cushion the imperforate surface layer is removed from the top surface of the cushion on which a person sits. In the case of the back cushion of a seat the imperforate surface layer would be removed from the cushion surface against which a person's back is intended to rest.

As illustrated in Figs. 4 and 5 the cushion 22 has an upper porous surface 23, the as molded imperforate layer having been removed from this surface. The remainder of the cushion surface however is left with an imperforate layer 25. This imperforate layer 25 is shown in the enlarged view of Fig. 5. If desired or necessary to provide a stronger imperforate layer over portions of the cushion surface any suitable impervious flexible coating may be painted or sprayed on said surface portions over or in place of their as-molded imperforate surface layer. The imperforate layer formed on the surface of each cavity 24 during the molding operation is likewise removed and the open end of each cavity is closed by a suitable means 26 cemented therein. Preferably each plug 26 has an opening 27 therethrough and a flap-type check valve 28 closes the inner end of said opening to prevent flow of air out of the associated cavity 24 through the opening 27 and to permit air to readily enter said cavity through said opening. Fig. 3 illustrates a check valve 28 in its closed position and the enlarged view of Fig. 5 illustrates a check valve in its open position.

The frame 14 is only schematically illustrated. In the case of the bottom seat cushion of an automobile seat, this frame 14 is designed to cooperate with the usual seat structure in automobiles. Also the seat cushion 22 may be covered with the usual fabric material or any other suitable outer covering may be applied to the cushion.

With the seat cushion structure described, as an occupant of the seat moves or bounces up and down on the seat to compress a particular cavity or cavities 24 air is forced out of said cavities into and through the open cells of the foam material 20 and thence through the porous upper surface 23 of the seat cushion to cool said occupant. When a cavity is thus compressed its check valve 28 closes to prevent air from being forced out the check valve end of said cavity, the other end of said cavity also being closed. When said occupant moves relative to the seat cushion to permit said cavities 24 to expand back to their original condition air immediately refills said cavities through their associated check valves 28. In this way there is a continual flow of air through the porous surface layer 23 of the seat cushion as the seat occupant moves relative to the seat. Obviously it is essential that the foam material 20 have cells of the open type in order for air to flow through said cells from the cavities 24 to the porous surface 23 of the cushion. As previously stated, preferably at least 50 percent of the cells of the foam material 20 are of the open type.

In order to increase the cooling air flow, cooling air may be continually supplied to the cavities 24 for flow therefrom through the porous surface layer 23 of the seat. Such an arrangement is illustrated in Fig. 6. In this modification an air supply manifold 30 is disposed across the valved ends of the cavities 24. A blower 32 is arranged to supply cooling air to the manifold 30 from which said air flows into the cavities 24 past their check valves 28 and then through the open cells of the cushion material 20 and out through the porous surface 23 of the seat. A valve 34 can be provided for controlling the amount of cooling air flowing through the cushion. With this added feature of Fig. 6, if additional cooling is desired the blower 32 is turned on and the valve 34 is adjusted to obtain the desired cooling air flow through the porous cushion surface 23.

Obviously it is not essential that the foam rubber-like material of the seat cushion extend for the entire depth of the cushion body or that said material be molded directly to a rigid frame as in Fig. 1. Also, means other than the core rods 18 may be provided for forming the large cavities in the cushion. For example these cavities may be formed along one surface of the foam cushion. Thus in the case of the bottom cushion of a seat said cavities could be formed along the under side of the cushion. Also the mold cavity check valves need not be disposed as in Figs. 3 and 5. In addition, the cushion may be formed in a mold in which the bottom surface of the mold conforms to the under surface of said seat cushion instead of to the top surface of said cushion as in Fig. 1. Figs. 1-6 could be modified by incorporating any one or any number of these variations. A modification incorporating all these variations is illustrated in Figs. 7 and 8.

Fig. 7 corresponds to Fig. 1 except in the mold of Fig. 7 the bottom of the mold forms the under surface of the seat cushion instead of to its upper surface as in Fig. 1. In Fig. 7 a mold structure 40 has an open mold cavity therein and the bottom of said mold cavity has a plurality of core projections 42 projecting upwardly from said bottom. As in Fig. 1, the surface of the mold preferably is covered with a suitable release agent. The foam mix is then introduced into the mold to form the foam body portion 44 of the cushion. After curing, the foam body 44 is removed from the mold. The top surface of the body 44 is cut to form the desired shape of the cushion top surface and to remove the imperforate surface layer formed at the top surface of said body thereby leaving said body with the desired porous upper surface. Also, the imperforate surface layer is removed from the cavities 46 formed by the core projections 42. As in the case of the cushion 22, the imperforate layer over the remainder of the outer surface of the body 44 may be covered with a suitable lacquer to increase their imperviousness. A suitable rigid panel 48 is secured across the under side of the body 44 across the cavities 46 to provide a rigid base structure for the cushion and to close the adjacent side of said cavities so that the only way air can flow out of said cavities is upwardly through the open cells of the foam cushion body 44 and then through the upper porous surface of said body. A suitable check valve 50 is preferably provided at an end surface of each cavity 46 permitting air to readily enter said cavity and preventing outflow flow of air through said end surface. As illustrated each check valve 50 cooperates with an opening in the panel 48. With this arrangement the cavities 46 obviously need not be elongate and need not extend across the cushion body to an end surface of said body as in Figs. 3-6. A manifold 52 may be disposed across the check valves 52 for supplying air to said cavities from a blower as in Fig. 6.

Where a manifold is disposed across end portions of the mold cavities, a single check valve, cooperable with an opening in the manifold could replace the previously described individual check valves for permitting air to readily flow into said cavities and for preventing air to flow out said cavity end portions.

It is essential that the large cavities within the foam material be spaced from the porous surface of the seat cushion through which cooling air flow is desired and that the only way air can flow out of said cavities is through the open cells of the foam material and thence through said porous surface. If the cavities are elongate as in Figs. 1-6 they need not extend from side-to-side across the seat cushion as illustrated in Figs. 1-8. For example in the case of the bottom cushion of a seat said elongate cavities may extend from the front to the back of the seat. Such a modification is illustrated in Fig. 9. Except for the orientation of the elongate cavities in the foam material the modification of Fig. 9 is like that of Figs. 3-5. For ease of understanding the parts of the cushion of Fig. 9 have been designated by the same reference numerals but with a subscript *a* added thereto as the corresponding parts of Figs. 3-5. Hence no further description of Fig. 9 appears necessary.

The cavities 24 in the foam material 20 may each be provided with a porous internal surface simply by not pre-coating the core rods 18 with a mold release agent as previously described. The foam material 20 will form an imperforate surface layer about each core rod 18 as before but now this layer will tightly adhere to its rod. After curing, if sufficient force (preferably including a twisting force) is applied to each rod 18 it can be withdrawn from the mold, said imperforate surface layer tearing neatly loose from the body of the foam material 20 and remaining secured to said rod as it is thus removed. In this way each cavity 24 is automatically provided with a porous internal surface as its core rod is removed. Each cavity 46 may be similarly automatically provided with a porous surface as its body 44 is removed from the mold. In fact any surface portion of the molded foam body can similarly be provided with a porous surface layer simply by not coating the corresponding mold surface with a release agent. Then when the molded foam body is removed from the mold the imperforate layer formed along this mold surface tears off and sticks to said surface. This, however, may make it difficult to remove the body from the mold.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A seat cushion comprising a body member of foam-type rubber-like material in which at least some of the cells of the material are of the open type, said body member having a plurality of cavities therein which are large compared to the size of said cells and are so arranged in the cushion that air can flow out of said cavities only thru the cells of said material, each of said cavities having a porous internal surface and at least a portion of the outer surface of said cushion being porous for air flow therethrough from said cavities and open cells.

2. A seat cushion as recited in claim 1 in which an outer surface portion of said cushion body member arranged for contact with a seat occupant is porous and at least certain of the other outer surface portions of the cushion body member have an imperforate surface layer.

3. A seat cushion as recited in claim 1 including means for supplying air to said cavities.

4. A seat cushion comprising a body member of foam-type rubber-like material in which at least some of the cells of said material are of the open type, said body member having a plurality of cavities therein which are large compared to the size of said cells, each of said cavities having a porous internal surface and being so disposed in the cushion that air can flow out of said cavities only thru the cells of said material, a portion of the outer surface of said body member, including a surface portion arranged for contact with a seat occupant, also being porous, and an imperforate surface layer over the remaining outer surface of said cushion body member.

5. A seat cushion as recited in claim 4 and including check valve means arranged to permit air to readily enter said cavities thru said valve means and to prevent outflow of air from said cavities thru said valve means.

6. A seat cushion construction comprising a cushion body member of foam-type rubber-like material in which at least some of the cells of said material are of the open type, said body member having a plurality of cavities therein which are large compared to the size of said cells, each of said cavities having a porous internal surface and being so disposed in the cushion that air can flow out of said cavities only thru the cells of said material, a portion of the outer surface of said body member, including a surface portion arranged for contact with a seat occupant, also being porous, an imperforate surface layer over the remaining outer surface of said cushion body member, and means external of said cushion body member for supplying air to said cushion cavities.

7. A seat cushion comprising a body member of foam-type rubber-like material in which at least fifty percent of the cells of said material are of the open type, said cushion body member having a plurality of cavities therein which are large compared to the size of said cells, each of said cavities having a porous internal surface and being so disposed in the cushion that air can flow out of said cavities only thru the cells of said material, a portion of the outer surface of the cushion body member, including a surface portion arranged for contact with a seat occupant, also being porous, and an imperforate surface layer over the remaining outer surface of said cushion body member, whereby air is pumped out of said cavities thru said porous outer surface in response to normal movements of a seat occupant against said porous outer surface of the seat cushion.

8. A seat cushion as recited in claim 7 and including a check valve for each cavity to permit air to readily enter said cavity thru said check valve and to prevent outflow of air from said cavity thru said check valve.

9. A seat construction comprising a cushion body member of foam-type rubber-like material in which at least fifty percent of the cells of said material are of the open type, said cushion body member having a plurality of cavities therein which are large compared to the size of said cells, each of said cavities having a porous internal surface and being so disposed in the cushion body member that air can flow out of said cavities only thru the cells of said material, a portion of the outer surface of the cushion body member, including a surface portion arranged for contact with a seat occupant, also being porous, an imperforate surface layer over the remaining outer surface of the cushion body member, each of said cavities having an end portion disposed adjacent to an outer surface of said cushion body member other than said outer porous surface, a check valve for each said cavity end portion to permit air to readily enter its cavity thru said check valve and to prevent outflow of air from said cavity thru said check valve, and means for supplying air to said cavities thru said check valves.

10. A seat cushion comprising a body member of foam-type rubber-like material in which at least some of the cells of said material are of the open type, said body member having a plurality of cavities therein which are large compared to the size of said cells, a portion of the outer surface of the cushion body member, including a portion arranged for contact with a seat occupant, being porous and each of said cavities having a porous internal surface and being so disposed in the cushion body member that air can flow out of said cavities only through the open cells of said material, each of said cavities having an end portion disposed adjacent to an outer surface of said cushion body member other than a surface portion arranged for contact with a seat occupant; and a check valve for each said cavity end portion to prevent outflow of air from said cavity past said check valve but to permit air to readily enter its cavity past said check valve for flow outwardly from said cavity through its internal porous surface, said open cells and said porous outer surface.

References Cited in the file of this patent

UNITED STATES PATENTS

| 1,843,893 | Becher | Feb. 2, 1932 |
| 2,068,134 | Houghton | Jan. 19, 1937 |
| 2,232,646 | Stone et al. | Feb. 18, 1941 |
| 2,290,614 | Rathbun | July 21, 1942 |
| 2,290,729 | Blair et al. | July 21, 1942 |
| 2,364,036 | Mackay et al. | Nov. 28, 1944 |
| 2,617,751 | Bickett | Nov. 11, 1952 |

FOREIGN PATENTS

| 409,827 | Germany | Feb. 13, 1925 |
| 471,722 | Great Britain | Sept. 9, 1937 |